Patented July 4, 1939

2,164,775

UNITED STATES PATENT OFFICE 2,164,775

WELDING FLUX

Wilber B. Miller, Niagara Falls, N. Y., assignor to Oxweld Acetylene Company, a corporation of West Virginia No Drawing. Application July 13, 1937, Serial No. 153,362

4 Claims. (Cl. 148—23)

The invention relates to fusion-deposition welding and refers more specifically to fluxes and flux coated electrodes for use in electric arc welding.

It is well known that harmful oxides and nitrides may be formed in steel by occlusion of oxygen and nitrogen from air by the molten metal during arc welding. Fluxes which have as a principal object the protection from the atmosphere of the molten steel as it passes through the arc and while it is in the molten pool have come into general use in the electric arc welding of steel. Other objects of welding fluxes include the addition of alloying elements to the weld metal from the flux and the production of clean, smooth welds substantially free from surface scale. In the ordinary applications of arc welding, it has been found convenient to employ the flux in the form of a uniform coating bound to the welding electrode.

Besides protecting the arc from the atmosphere, welding fluxes must have other characteristics to be entirely satisfactory. It is essential that the slag produced by a flux have proper consistency. The slag should not pile up in front of the electrode in a mass, since such piling up causes uneven deposition of metal and often results in slag inclusions at the junction of weld and base metal. Rather, the slag should be fluid enough to follow the arc, allowing quiet, uninterrupted welding; but if the slag is too fluid, overhead welding is difficult or impossible. If the melting point of the flux is greatly above that of the metal of the electrode, the current required to melt the flux is excessive and the metal may be overheated, causing porosity in the finished weld. For these reasons, it is desirable that the proper fluidity of the flux be attained at a temperature approximately equal to, or slightly lower than, the melting point of the electrode, for with such a condition the flux will be sufficiently fluid to flow over the solidified weld metal, protect it from atmospheric oxidation, and delay somewhat its cooling rate.

The flux should not evolve objectionable or harmful fumes. The slag produced should be easily removable from the finished weld, particularly in multiple-pass welding where one bead is laid down on top of another.

It is an object of this invention to provide an improved flux, for use in arc welding, which meets the requirements discussed above. A further object of the invention is to provide a flux coated electrode for arc welding which may be used with either positive or negative polarity in direct current welding, or with alternating current, and for welding in any position.

My invention comprises a flux for electric welding which contains as essential ingredients an oxydic compound of titanium and an oxydic compound of zirconium. The invention also includes an electrode for electric welding coated with said flux. The oxydic compound of titanium may be, for instance, rutile, ilmenite, titanium dioxide, or titanates of the alkali or alkaline earth metals. Similarly, the oxydic compound of zirconium may be, for example, zirconia, or zirconia ore. Preferably, the titanium and zirconium compounds are present in proportions between three and five parts of titanium dioxide to each two parts of zirconia.

The welding flux may, and preferably does, also contain one or more further ingredients such as wood flour, slip clay, ferromanganese, and a binder. Sodium silicate solution may be used as the binder. The invention includes mixtures which contain, on a dry basis, by weight:

|  | Percent |
|---|---|
| Titanium oxide | 20 to 30 |
| Zirconium oxide | 7 to 15 |
| Wood flour | 9 to 15 |
| Slip clay | 20 to 30 |
| Ferromanganese | 8 to 12 |
| Sodium silicate | 10 to 20 |

In one application of my invention to coated electrodes, a dry mix was made up which contained 32% slip clay, 14% zirconia ore, 32% rutile, 12% wood flour, and 10% ferromanganese. To 25 pounds of this mixture were added 9 pounds and 2 ounces of sodium silicate solution which contained about 56.4% water. The whole was mixed to a plastic mass, and applied to mild steel wires by extrusion. The coated electrodes so produced were dried by baking. A thickness of coating was applied such that the finished, dried electrodes consisted of 8% to 20% coating and 92% to 80% core wire. The zirconium ore contained 68% zirconium oxide, 13% silica, 4% iron oxide, and 3.75% alumina, with small quantities of minor constituents. The rutile contained about 95% titanium oxide. Tensile tests made on standard 0.505 inch diameter tensile test specimens of weld metal, in the as-welded condition, taken from a multi-pass weld in one inch thick plate using the coated electrodes so coated, showed that the deposited weld filler material had a yield point of 64,250 pounds per square inch and an ultimate strength of 77,500 pounds per square inch with 20% elongation in 2 inches and 33% reduction of area. Chemical analysis of the weld metal showed it to be of the following composition: 0.08% carbon, 0.35% manganese, 0.27% silicon, 0.009% nitrogen, the remainder iron with traces of sulfur and phosphorus. The extremely low nitrogen content of the deposited weld metal is evidence that a high degree of protection is imparted by the flux coating of my invention.

Mild steel electrodes coated with the flux of my invention may be used with either positive or negative polarity in direct current welding or with alternating current. With the electrode negative in direct current methods a fast welding rate may be employed. In all cases a slag of good characteristics is produced so that desired protection is afforded the metal passing through the arc, the molten pool, and deposited metal. It possesses proper fluidity and the electrode may be used for welding in any position: horizontal, vertical, or overhead, and with either single pass or multiple pass welding. When solidified, the slag is easily removed, leaving the deposited weld filler material smooth, uniform, and clean in appearance. Thus, it will be seen that the composition of my invention meets the requirements for a satisfactory welding flux and may be used in many applications.

While a specific example has been given of compositions of flux and weld metal which have been successfully used, it is to be understood that the invention is not limited to these compositions in its practice. For example, the manganese or silicon content of the flux may be increased to yield higher percentages of manganese or silicon in the deposited metal, and many other ingredients commonly used in welding fluxes may be added in minor amounts without departing from the invention.

I claim:

1. Flux, for electric welding, containing as essential ingredients an oxydic compound of titanium and an oxydic compound of zirconium so proportioned that the ratio of titanium oxide to zirconium oxide is between 1.5 and 2.5.

2. Flux, for electric welding, containing 20% to 30% slip clay, 9% to 15% cellulosic material, 8% to 12% ferromanganese, oxydic compound of titanium to impart 20% to 30% titanium oxide, and oxydic compound of zirconium to impart 7% to 15% zirconium oxide.

3. Flux, for electric welding, containing 20% to 30% slip clay, 9% to 15% wood flour, 8% to 12% ferromanganese, 20% to 30% titanium oxide, and 7% to 15% zirconium oxide.

4. Flux, for electric welding, containing 32 parts slip clay, 14 parts zirconia ore, 32 parts rutile, 12 parts wood flour, 10 parts ferromanganese, and sodium silicate as a binder.

WILBER B. MILLER.